Figure 1:
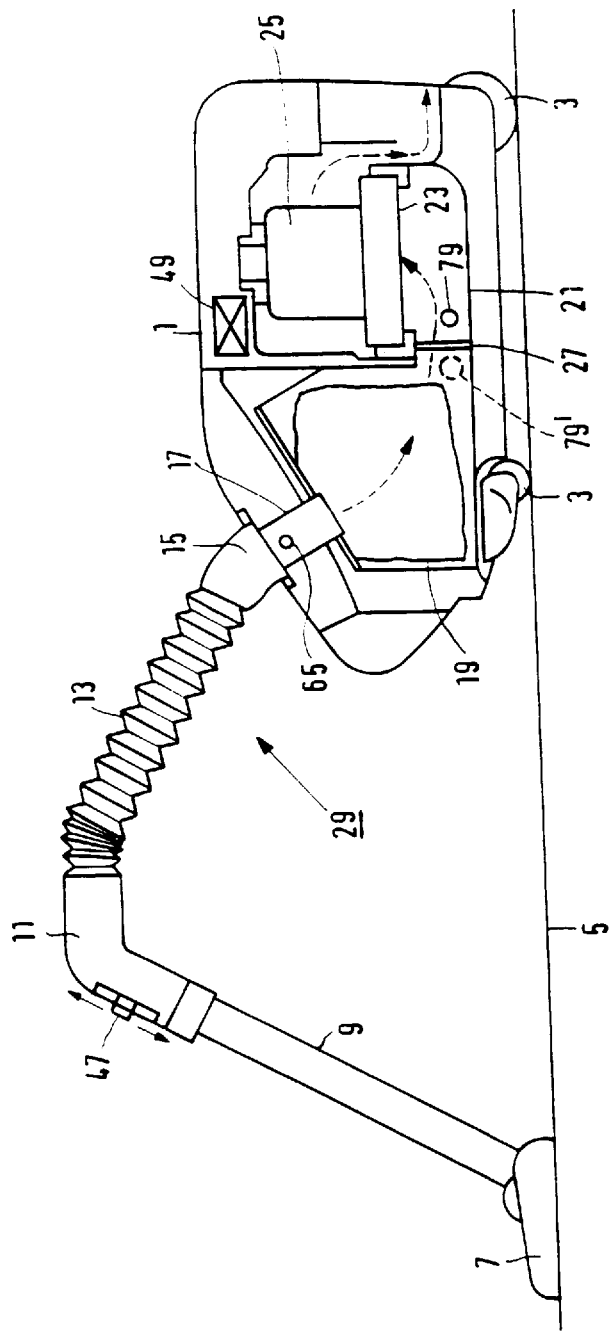

United States Patent [19]
Driessen et al.

[11] Patent Number: 5,881,430
[45] Date of Patent: Mar. 16, 1999

[54] VACUUM CLEANER WITH POWER CONTROL IN DEPENDENCE ON A MODE OF OPERATION OF AN ELECTRICAL BRUSH

[75] Inventors: Johannes A.T. Driessen, Hoogeveen; Michiel A.A. Schallig, Drachten; Raimond Visser, Eindhoven, all of Netherlands

[73] Assignee: U.S. Philips Corporation, New York, N.Y.

[21] Appl. No.: 804,510

[22] Filed: Feb. 24, 1997

Related U.S. Application Data

[63] Continuation of Ser. No. 697,466, Aug. 26, 1996, abandoned.

[30] Foreign Application Priority Data

Aug. 25, 1995 [EP] European Pat. Off. .............. 95202308

[51] Int. Cl.⁶ ........................................................ A47L 9/28
[52] U.S. Cl. ............................................. 15/319; 15/339
[58] Field of Search ...................................... 15/319, 339

[56] References Cited

U.S. PATENT DOCUMENTS

| | | | |
|---|---|---|---|
| 4,357,729 | 11/1982 | Vander Molen et al. | 15/319 |
| 4,654,924 | 4/1987 | Getz et al. | 15/319 |
| 4,953,253 | 9/1990 | Fukuda et al. | 15/319 |
| 5,243,732 | 9/1993 | Koharagi et al. | 15/319 |
| 5,255,409 | 10/1993 | Fujiwara et al. | 15/319 |
| 5,276,939 | 1/1994 | Uenishi | 15/319 |
| 5,507,067 | 4/1996 | Hockstra et al. | 15/319 |

FOREIGN PATENT DOCUMENTS

| | | | |
|---|---|---|---|
| 499235 | 8/1992 | European Pat. Off. | 15/319 |

*Primary Examiner*—Chris K. Moore
*Attorney, Agent, or Firm*—Ernestine C. Bartlett; Steven R. Biren

[57] ABSTRACT

A vacuum cleaner comprises a suction unit (23) which is drivable by means of a first electric motor (25). A suction attachment (7) of the vacuum cleaner comprises a rotatable brush (41) which is drivable by means of a second electric motor (45). The vacuum cleaner comprises a control unit (29) by means of which an electric current through the first motor (25) can be controlled. In accordance with the invention, the control unit (29) controls the current through the first motor (25) as a function of a mode of operation of the brush (41), which mode can be selected by a user of the vacuum cleaner. In this way, the suction power of the suction unit (23) is adapted to the mode of operation of the brush (41), thereby improving a relationship between cleaning performance, ease of use, current consumption and noise production of the vacuum cleaner. In a special embodiment of a vacuum cleaner in accordance with the invention the control unit (29) controls an air pressure and an air flow in the suction attachment (7) in such a manner that the air pressure does not decrease below a first limit value ($H_{MIN}$), the air flow does not exceed a second limit value ($Q_{MAX}$), and at least one of the limit values ($H_{MIN}$, $Q_{MAX}$) is substantially reached.

19 Claims, 3 Drawing Sheets

VACUUM CLEANER WITH POWER CONTROL IN DEPENDENCE ON A MODE OF OPERATION OF AN ELECTRICAL BRUSH

This is a continuation of application Ser. No. 08/697,466, filed Aug. 26, 1996, abandoned.

BACKGROUND OF THE INVENTION

1. Field of the Invention

The invention relates to a vacuum cleaner including a housing, a suction unit accommodated in the housing and drivable by means of a first electric motor, a suction attachment having a rotatable brush which is drivable by means of a second electric motor, and an electrical control unit for controlling an electric current through the first motor.

2. Description of the Related Art

A vacuum cleaner of the type defined in the opening paragraph is known from EP-B-0 458 057. The known vacuum cleaner has a pressure sensor for measuring an air pressure in the suction attachment. When during operation a user of the vacuum cleaner moves the suction attachment over a surface to be cleaned, the air pressure in the suction attachment fluctuates because the air drawn in by the suction unit via the surface and the suction attachment encounters a fluctuating resistance owing to irregularities in the surface. The pressure fluctuations in the suction attachment have an amplitude which depends on the type of surface over which the suction attachment is moved. The pressure fluctuations are comparatively large when the surface is for example a carpet, whereas the pressure fluctuations are comparatively small when the surface is smooth, as for example in the case of wooden floors or tile floors. The control unit of the known vacuum cleaner comprises a microprocessor which detects the type of surface on the basis of the amplitude of the pressure fluctuations measured by means of the pressure sensor in the suction attachment. The microprocessor controls the currents through both the first motor, which drives the suction unit, and the second motor, which drives the brush, depending on the detected type of surface. In this way, the control unit adapts the suction power of the suction unit and the speed of rotation of the brush to the detected type of surface, so that an optimum relationship between cleaning performance, ease of use, current consumption and noise production of the vacuum cleaner is obtained for different types of surface.

A disadvantage of the known vacuum cleaner is that the pressure fluctuations in the suction attachment are influenced by the manner in which the user handles the vacuum cleaner. If the user, for example, holds the suction attachment in a fixed position on a carpet or moves the suction attachment with a comparatively large hold-down pressure over a carpet, the pressure fluctuations in the suction attachment have a comparatively small amplitude, as a result of which it is possible that the control unit detects a smooth type of surface and does not adapt the suction power of the suction unit and the speed of rotation of the brush to the carpet in an optimum manner. If the user moves the suction attachment away from a smooth floor and puts it back several times in succession, the pressure fluctuations in the suction attachment have a comparatively large amplitude, as a result of which the control unit may detect a carpet. Such misinterpretations by the control unit of the known vacuum cleaner can be prevented by providing the microprocessor of the control unit with a number of additional control rules. However, as a result of this, the control unit becomes comparatively complicated and slow.

SUMMARY OF THE INVENTION

It is an object of the invention to provide a vacuum cleaner of the type defined in the opening paragraph, in which the control of the current through the motor driving the suction unit is less dependent on the manner in which the vacuum cleaner is handled by a user, so as to improve the relationship between cleaning performance, ease of use, current consumption and noise production of the vacuum cleaner.

To this end, a vacuum cleaner in accordance with the invention is characterized in that the current through the first motor is controllable by means of the control unit as a function of a mode of operation of the brush, which mode can be selected by a user of the vacuum cleaner. The mode of operation of the brush, for example an off-mode, an on-mode or a speed of rotation of the brush, can be set by the user by means of, for example, a switch and is selected by the user in dependence on the type of surface to be cleaned. The control unit receives an electric signal, which is determined, for example, by a setting of said switch, and selects a control program, for example from a plurality of predetermined control programs, depending on this electric signal. Setting the brush to an optimum mode of operation for a given type of surface is simple for the user and is generally carried out more accurately by the user than, for example, a uniform movement of the suction attachment, which is necessary for a correct detection of the type of surface with the afore-mentioned known vacuum cleaner. Since the control unit controls the current through the first motor as a function of the mode of operation of the brush thus set by the user, the control of the suction power of the suction unit is less dependent on the manner in which the user handles the vacuum cleaner, so that in most cases the suction power of the suction unit is better adapted to the type of surface and the relationship between cleaning performance, ease of use, current consumption and noise production of the vacuum cleaner is improved.

It is to be noted that in the foregoing and hereinafter the expression "the control or the measurement of an electric current through the first motor" is to be understood to mean not exclusively the control or the measurement of an amount of electricity which flows through the first motor per unit of time. The manner in which the electric current through the first motor is controlled is connected with the manner in which the first motor is electrically powered. For example, the electric current through the first motor can also be controlled by controlling the voltage across the first motor or by controlling a pulse width of the electric current through the first motor, i.e. a phase angle of the voltage across the first motor. Thus, the electric current through the first motor can, for example, also be measured by measuring the voltage across the first motor or by measuring said pulse width of the electric current through the first motor.

A special embodiment of a vacuum cleaner in accordance with the invention is characterized in that the control unit controls the current through the first motor in such a manner that an air pressure in the suction attachment does not decrease below a first limit value, an air flow in the vacuum cleaner does not exceed a second limit value, and at least one of the two limit values is reached, the control unit determining at least one of the two limit values in dependence upon the mode of operation selected for the brush by the user. When the suction attachment is moved over a deep-pile carpet, the air drawn in by the suction unit via the carpet encounters a comparatively high resistance, resulting in a comparatively low air pressure and a comparatively weak air flow in the suction attachment. In this case the control unit controls the current through the first motor in such a manner that the air pressure in the suction attachment has a value corresponding to the first limit value, the air flow having a value smaller than the second limit value. This restricts an advancing force which is to be exerted on the suction attachment by the user and which increases as the air pressure in the suction attachment decreases, so that the ease of use of the vacuum cleaner is improved. When the suction attachment is moved over a short-pile carpet or over a smooth floor, the air drawn in by the suction unit via the carpet or the floor encounters a comparatively low resistance, which results in a comparatively high air pressure and a comparatively strong air flow in the suction attachment. In this case the control unit controls the current through the first motor in such a manner that the air flow in the vacuum cleaner has a value corresponding to the second limit value, the air pressure in the suction attachment having a value larger than the first limit value. This prevents the air flow in the vacuum cleaner from reaching a value larger than necessary for a satisfactory cleaning action of the suction attachment, thereby limiting the current consumption and the noise production of the vacuum cleaner. Moreover, this prevents a high speed and a consequent high load and power consumption of the first motor when the suction attachment is moved away from the surface to be cleaned, in which case there is practically no more partial vacuum in the suction attachment. As the control unit determines at least one of the two limit values in dependence on the mode of operation of the brush selected by the user, the air pressure in the suction attachment or the air flow in the vacuum cleaner is automatically adapted to the mode of operation of the brush, which is selected by the user depending on the type of surface. By an appropriate choice of said limit values as a function of the mode of operation of the brush, the relationship between the cleaning performance, the ease of use, the current consumption and the noise production of the vacuum cleaner is improved.

A further embodiment of a vacuum cleaner in accordance with the invention is characterized in that the second limit value has a first value if the brush has been turned off and has a second value if the brush has been turned on, the first value being greater than the second value. The rotatable brush in the suction attachment serves for brushing a carpet, as a result of which dust and dirt particles in the carpet come loose. The brush thus has a cleaning action on carpeting. On a smooth floor the brush has hardly or no effect. Therefore, the user should turn on the brush to clean carpeting and should turn off the brush to clean smooth floors. Since the brush exerts a cleaning action on carpeting, the air flow in the suction attachment serves almost exclusively for the transport of the dust and dirt particles worked loose by the brush during carpet cleaning. In the case of a smooth floor the air flow has both a cleaning and a transport function. Since the limit value of the air flow is smaller with a turned-on brush than with a turned-off brush, the air flow is adapted to the function and operation of the brush as described above and is limited when the brush is operative during carpet cleaning and performs the cleaning function.

A still further embodiment of the vacuum cleaner in accordance with the invention is characterized in that the control unit comprises a processor which determines the air flow as a function of a suction pressure of the suction unit, which suction pressure is measured upstream and in the proximity of the suction unit, and a measured electric current through the first motor. Since a relationship between said suction pressure of the suction unit, the electric current through the first motor and the air flow through the suction unit can be measured or calculated in advance and said suction pressure and the electric current through the first motor can be measured in a comparatively simple manner, a comparatively difficult and unreliable direct measurement of the air flow is avoided by means of this embodiment.

A special embodiment of a vacuum cleaner in accordance with the invention is characterized in that the processor comprises an electrical memory in which a relationship between the air flow, the suction pressure of the suction unit and the electric current through the first motor is stored in the form of a table. Since said processor stores said relationship in the form of a table, the value of the air flow is read accurately and without any significant delay, so that the control unit has a response time which is not adversely affected by said processor.

A further embodiment of a vacuum cleaner in accordance with the invention is characterized in that the control unit comprises a processor which determines the air flow as a function of a suction pressure of the suction unit, which suction pressure is measured upstream and in the proximity of the suction unit, and a measured speed of the first motor. Since a relationship between said suction pressure of the suction unit, the speed of the first motor and the air flow through the suction unit can be measured or calculated in advance and said suction pressure and the speed of the first motor can be measured in a comparatively simple manner, a comparatively difficult and unreliable direct measurement of the air flow is avoided by means of this embodiment.

Yet another embodiment of a vacuum cleaner in accordance with the invention is characterized in that the suction pressure of the suction unit is measurable by means of a pressure sensor arranged between a dust container of the vacuum cleaner and the suction unit. If a filter for the suction unit is disposed between the dust container of the vacuum cleaner and the suction unit, a suction pressure measurement which is as accurate as possible is achieved if the pressure sensor is interposed between the filter and the suction unit. However, alternatively the pressure sensor can be arranged between the dust container and the filter, but in this case allowance is to be made for pressure losses as a result of soiling of the filter.

A special embodiment of a vacuum cleaner in accordance with the invention is characterized in that the first limit value is independent of the mode of operation selected for the brush by the user, the air pressure in the suction attachment being measurable by means of a pressure switch. In this embodiment the first limit value has a constant predetermined value. Said pressure switch is of simple construction and is set to said constant value of the first limit value. If the air pressure in the suction attachment is greater than the first limit value the pressure switch has for example been turned on and the pressure switch supplies an electric signal corresponding to an on-state. If the pressure in the suction attachment is smaller than the first limit value the pressure switch has been turned off and the pressure switch supplies an electric signal corresponding to an off-state.

A further embodiment of a vacuum cleaner in accordance with the invention is characterized in that the air pressure in the suction attachment is measurable by means of a pressure sensor arranged near a coupling member by means of which a hose which can be placed between the suction attachment and the housing can be coupled to the housing. As the resistance met by the air flow in the suction hose is low relative to the resistance met by the air flow past the surface to be cleaned and in the suction attachment, an air pressure prevailing near said coupling member substantially corresponds to the air pressure in the suction attachment. Since the pressure sensor has been arranged near said coupling member an electrical connection for the pressure sensor between the suction attachment and the housing is avoided.

Figure 2:
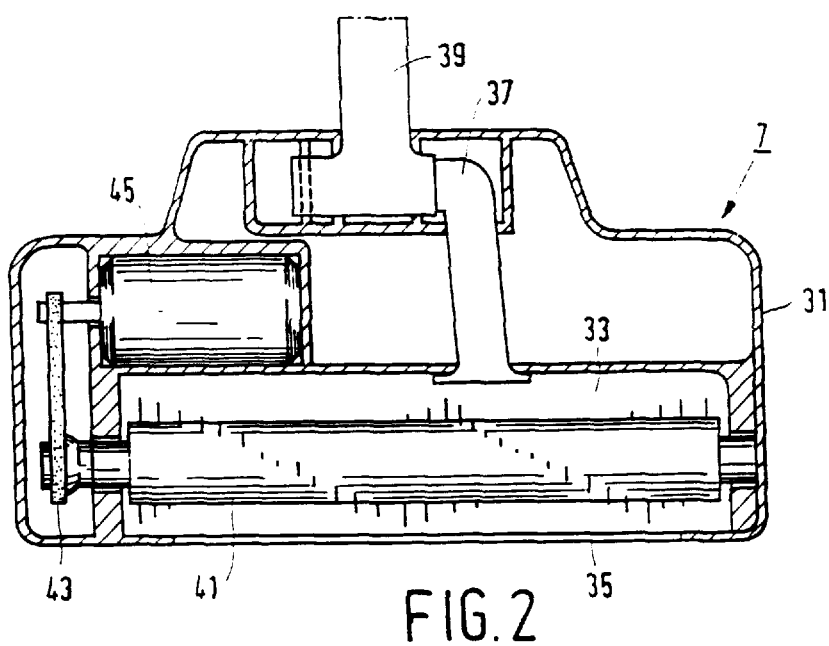
Figure 4:
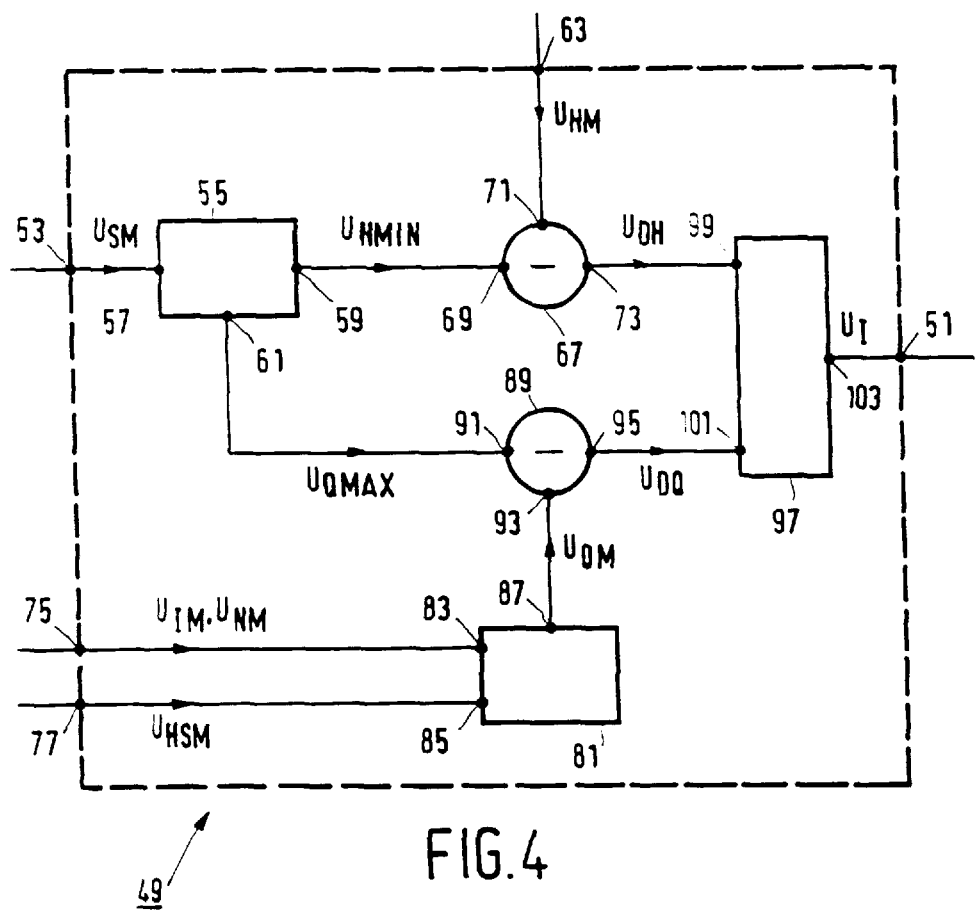
Figure 3:
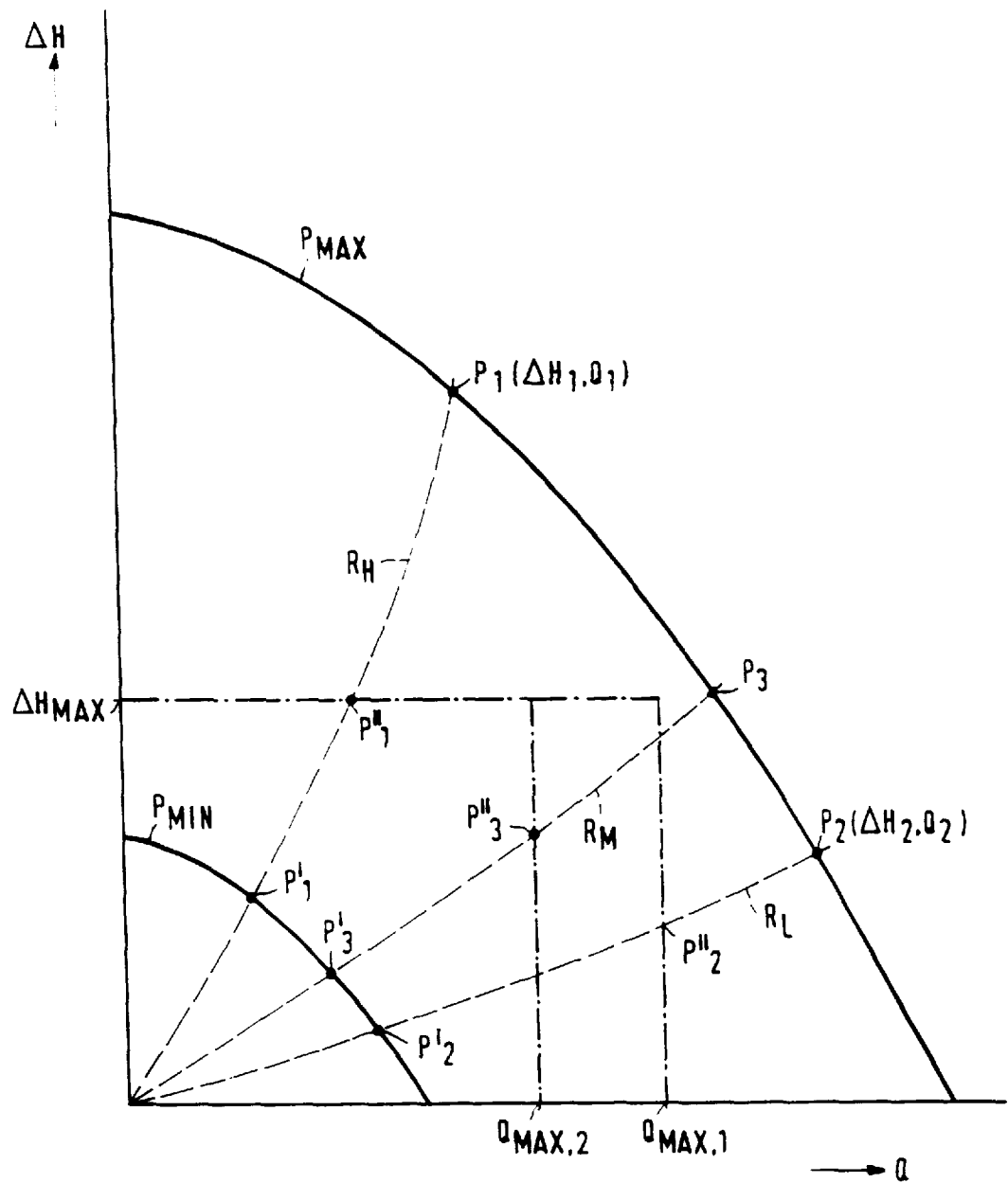

The invention will be described in more detail hereinafter with reference to the drawings, in which FIG. 1 shows diagrammatically a vacuum cleaner in accordance with the invention, FIG. 2 shows a suction attachment of the vacuum cleaner shown in FIG. 1, FIG. 3 illustrates a relationship between a partial vacuum and an air flow in the suction attachment shown in FIG. 2, and FIG. 4 shows diagrammatically a control unit of the vacuum cleaner shown in FIG. 1.

A vacuum cleaner in accordance with the invention shown in FIG. 1 comprises a housing 1 having a number of wheels 3 by means of which the housing 1 is movable over a surface 5 to be cleaned. The vacuum cleaner further comprises a suction attachment 7, which is pivotably coupled to a suction tube 9. The suction tube 9 is coupled to a handle 11, which is coupled to the housing 1 via a suction hose 13 and a coupling member 15. A duct 17 in the housing 1 terminates in an exchangeable dust container 19. A further duct 21 in the housing 1 connects the dust container 19 to a suction unit 23, which is drivable by means of a first electric motor 25 accommodated in the housing 1. A filter 27 is disposed in the further duct 21. In operation, the suction unit 23 generates a partial vacuum in an air channel 29 formed by the suction attachment 7, the suction tube 9, the suction hose 13, the duct 17, the dust container 19 and the further duct 21, as a result of which an air flow is produced in the air channel 29 and dust and dirt particles present on the surface 5 to be cleaned are picked up and collected in the dust container 19. The filter 27 serves to prevent dust and dirt particles from entering the suction unit 23 if the dust container 19 is fitted incorrectly or is damaged.

The suction attachment 7 is shown in detail in FIG. 2 and has a housing 31 in which a vacuum chamber 33 is situated which terminates in a suction opening 35. The vacuum chamber 33 is connected to a coupling member 39 via a duct 37, by means of which coupling member 39 the suction attachment 7 can be coupled to the suction tube 9. FIG. 2 further shows a cylindrical brush 41 situated in the vacuum chamber 33, which brush extends parallel to the suction opening 35 and is rotatably mounted in the housing 31. The brush 41 is drivable by means of a second electric motor 45 via a belt 43, which second motor is accommodated in the housing 31 outside the vacuum chamber 33.

As is shown in FIG. 1, a switch 47 is disposed on the handle 11 by means of which a user of the vacuum cleaner can start a mode of operation of the brush 41. The switch 47 has at least a first position in which the brush 41 is turned off and a second position in which the brush 41 is turned on, but in an alternative embodiment it may have more than two positions corresponding to mutually different speeds of rotation of the brush 41. The brush 41 is to be used for cleaning a carpet. The rotating brush 41 brushes dust and dirt particles out of the carpet, after which said particles are conveyed to the dust container 19 by the air flow in the vacuum chamber 33 and the air channel 39. Thus, the brush 41 has a cleaning function on carpets and the air flow in the vacuum chamber 33 has mainly a transport function. On a smooth floor a rotating brush 41 has hardly or no effect, for which reason the brush 41 should be turned off on a smooth floor. For a smooth floor the air flow in the vacuum chamber 33 thus has both a cleaning function and a transport function. If the switch 47 has only two positions, the user should therefore turn on the brush 41 to clean carpets and turn it off to clean smooth floors. To clean carpets with the aforementioned alternative embodiment the user should also select an optimum speed of rotation of the brush 41 for the relevant type of carpet, for example a comparatively high speed of rotation for deep-pile carpets and a comparatively low speed of rotation for short-pile carpets. Since the switch 47 on the handle 11 has a readily accessible position for the user, selection of an optimum mode of operation of the brush 41 for a type of surface 5 by a user is easy, as a result of which the user in most cases actuates the switch 47 correctly.

The partial vacuum and the air flow generated in the vacuum chamber 33 of the suction attachment 7 by the suction unit 23 have values which depend on a resistance encountered by the air flowing past the surface 5 to be cleaned and the edges of the suction opening 35. FIG. 3 shows a $\Delta H$-Q diagram with a curve $P_{MAX}$ representing a relationship between a partial vacuum $\Delta H$ in the vacuum chamber 33 and an air flow Q in the vacuum chamber 33 when the first motor 25 of the suction unit 23 has its maximum power or speed. A point $P_1$ on the curve $P_{MAX}$ is an operating point which occurs in the case of a comparatively high resistance to the air flow, which occurs for example during cleaning of a deep-pile carpet. The partial vacuum $\Delta H_1$ generated in the operating point $P_1$ is comparatively high, whereas the air flow $Q_1$ is comparatively weak. Point $P_2$ on the curve $P_{MAX}$ is an operating point which occurs in the case of a comparatively low resistance to the air flow, which occurs for example during cleaning of a smooth floor. The partial vacuum $\Delta H_2$ generated in the operating point $P_2$ is comparatively low, whereas the air flow $Q_2$ is comparatively strong. Point $P_3$ on the curve $P_{MAX}$ represents an operating point between points $P_1$ and $P_2$, which occurs for example during cleaning of a short-pile carpet when the resistance to the air flow is medium. FIG. 3 also shows a curve $P_{MIN}$ which represents a relationship between the partial vacuum $\Delta H$ in the vacuum chamber 33 and the air flow Q in the vacuum chamber 33 when the first motor 25 of the suction unit 23 operates at its minimum power or speed. If the power delivered by the first motor 25 is reduced from the maximum power $P_{MAX}$ to the minimum power $P_{MIN}$, the operating point $P_1$ is shifted along a curve $R_H$ shown in FIG. 3 to a point $P'_1$, on the curve $P_{MIN}$. The curve $R_H$ corresponds to a constant comparatively high air-flow resistance. Likewise, if the power delivered by the first motor 25 is reduced, the operating points $P_2$ and $P_3$ are shifted to points $P'_2$ and $P'_3$, respectively, on the curve $P_{MIN}$ along the curve $R_L$ and the curve $R_M$, respectively. The curves $R_L$ and $R_M$ correspond to a comparatively low air-flow resistance and a medium air-flow resistance, respectively.

As is further shown in FIG. 1, the vacuum cleaner comprises a control unit 49 by means of which an electric current through the first motor 25 can be controlled. The control unit 49, which is accommodated in the housing 1 of the vacuum cleaner, is shown diagrammatically in FIG. 4. The control unit 49 controls the current through the first motor 25 in such a manner that an air pressure H in the vacuum chamber 33 of the suction attachment 7 does not decrease below a first constant limit value $H_{MIN}$ and the air flow Q in the vacuum chamber 33 of the suction attachment 7 does not exceed a second constant limit value $Q_{MAX}$, at least one of the two limit values $H_{MIN}$ and $Q_{MAX}$ in the vacuum chamber 33 being almost reached. The control unit 49 determines at least one of the limit values $H_{MIN}$ and $Q_{MAX}$ as a function of the mode of operation of the brush 41 set by the user via the switch 47. In the embodiment of a vacuum cleaner in accordance with the invention shown in FIGS. 1 to 4 the first limit value $H_{MIN}$, which corresponds to a limit value $\Delta H_{MAX}$ for the partial vacuum $\Delta H$ in the vacuum chamber 33, is independent of the mode of operation to which the brush 41 has been set, while the second limit value $Q_{MAX}$ has a first constant value $Q_{MAX,1}$ if the brush 41 has been turned off and a second constant value $Q_{MAX,2}$ if the brush 41 has been turned on, $Q_{MAX,1}$ being greater than $Q_{MAX,2}$.

The $\Delta H$-Q diagram in FIG. 3 illustrates the above control strategy of the control unit 49. If the air-flow resistance is comparatively high, as for example on deep-pile carpets, the partial vacuum $\Delta H$ in the vacuum chamber 33 reaches the limit value $\Delta H_{MAX}$, which corresponds to the first limit value $H_{MIN}$, in accordance with the control strategy described above. The air flow Q then remains below the second limit value $Q_{MAX,2}$. If the resistance corresponds, for example, to the resistance in accordance with the curve $R_H$ (deep-pile carpet), an operating point $P''_1$, on the straight line $\Delta H_{MAX}$ shown in FIG. 3 is reached. If the resistance increases the operating point is shifted to the left along the straight line $\Delta H_{MAX}$ and the power delivered by the first motor 25 and the air flow Q decrease, and if the resistance decreases the operating point is shifted to the right along the straight line $\Delta H_{MAX}$ and the power delivered by the first motor 25 and the air flow Q increase. Since the partial vacuum $\Delta H$ in the vacuum chamber 33 is limited at a comparatively high air-flow resistance, it is achieved that an advancing force to be exerted by the user in order to move the suction attachment 7 over the deep-pile carpet is limited, as a result of which the ease of use of the vacuum cleaner is improved. This is because said advancing force is determined by a product of a coefficient of friction between the carpet and the suction attachment 7 and a normal force between the carpet and the suction attachment 7, the normal force having a component which is the product of said partial vacuum $\Delta H$ and an area of the suction opening 35 of the suction attachment 7. Said component is limited by limiting the partial vacuum $\Delta H$ in the vacuum chamber 33.

If the air-flow resistance is comparatively low or average, as for example on a smooth floor or on short-pile carpet, the air flow in the vacuum chamber 33 reaches the second limit value $Q_{MAX,1}$ or $Q_{MAX,2}$, depending on the setting of the brush 41, in accordance with the control strategy described above. The air pressure in the vacuum chamber 33 then remains above the first limit value $H_{MIN}$, as a result of which the partial vacuum remains below the limit value $\Delta H_{MAX}$. If the resistance corresponds, for example, to the resistance in accordance with the curve $R_L$ in FIG. 3 (smooth floor) and the user has consequently turned off the brush 41, an operating Point $P''_2$ is reached on the straight line $Q_{MAX,1}$. If the resistance increases the operating point is shifted upwards along the straight line $Q_{MAX,1}$ and the power delivered by the first motor 25 and the partial vacuum $\Delta H$ in the vacuum chamber 33 increase, and if the resistance decreases the operating point is shifted downwards along the straight line $Q_{MAX,1}$ and the power delivered by the first motor 25 and the air flow Q diminish. If the resistance corresponds to the resistance in accordance with the curve $R_M$ (short-pile carpet) and the user has consequently turned on the brush 41, an operating point $P''_3$ on the straight line $Q_{MAX,2}$ shown in FIG. 3 is reached. Since the limit value $Q_{MAX,2}$ is smaller than the limit value $Q_{MAX,1}$, the air flow is limited when the brush 41 has been turned on by the user during the cleaning of short-pile carpet. As described hereinbefore, the air flow in this case has merely a transport function, as a result of which a limitation of the air flow does not adversely affect the cleaning performance of the vacuum cleaner. The current consumption and the noise production of the vacuum cleaner in the turned-on state of the brush 41 are thus reduced. If the suction attachment 7 is moved away from the surface 5 to be cleaned, the partial vacuum in the vacuum chamber 33 disappears almost completely. Also in this case the air flow is limited in accordance with the above control strategy to the second limit value $Q_{MAX,1}$ or $Q_{MAX,2}$ depending on the selected mode of operation of the brush 41. In this way the speed of the first motor 25, the current consumption and the noise production of the vacuum cleaner are limited when the suction attachment 7 is moved away from the surface 5 to be cleaned.

To carry out the control strategy described hereinbefore the control unit 49 as shown in FIG. 4 comprises a feedback control loop. The control unit 49 has an electrical output 51 for supplying an electric signal $u_I$ which corresponds to a desired electric current through the first motor 25. The nature of the signal $u_I$ depends on the manner in which the motor 25 is powered. The embodiment of a vacuum cleaner in accordance with the invention shown in the Figures comprises a customary triac circuit, known per se, by means of which the motor 25 is powered, the signal $u_I$ corresponding to a desired pulse width of the electric current through the motor 25, i.e. to a phase angle $\phi_T$ of a voltage across the motor 25 at which the triac circuit should interrupt the current through the motor 25. In another embodiment the motor 25 can also be powered in an alternative manner, the signal $u_I$ for example corresponding to a magnitude of a desired electric current through the motor 25 or a magnitude of a desired voltage across the motor 25.

As is further shown in FIG. 4, the control unit 49 has a first electrical input 53 for receiving an electric signal $u_{SM}$ which corresponds to a mode of operation of the brush 41 selected by the user. The signal $u_{SM}$ is supplied by, for example, a position sensor, not shown in the Figures, by means of which a position of the switch 47 can be measured. Instead of the position of the switch 47, it is for example also possible to measure the electric current through the second motor 45 or the speed of the brush 41, in which case the signal $u_{SM}$ corresponds to the measured electric current through the second motor 45 or to the measured speed of the brush 41. The control unit 49 further comprises a first microprocessor 55 having an electrical input 57 for receiving the signal $u_{SM}$, a first electrical output 59 for supplying an electric signal $u_{HMIN}$, and a second electrical output 61 for supplying an electric signal $u_{QMAX}$. The signal $u_{HMIN}$ corresponds to a desired first limit value $H_{MIN}$ of the air pressure in the vacuum chamber 33 and the signal $u_{QMAX}$ corresponds to a desired second limit value $Q_{MAX}$ of the air flow in the vacuum chamber 33. The first microprocessor 55 determines the signals $u_{HMIN}$ and $u_{QMAX}$ as a function of the signal $u_{SM}$ in accordance with the control strategy described hereinbefore.

The control unit 49 further has a second electrical input 63 for receiving an electric signal $u_{HM}$ which corresponds to a measured air pressure in the vacuum chamber 33. The signal $u_{HM}$ is supplied by a customary first pressure sensor 65, shown only diagrammatically in FIG. 1 and known per se, which sensor is disposed in the air channel 29 near the coupling member 15. The air pressure measured by the first pressure sensor 65 near the coupling member 15 substantially corresponds to the air pressure in the vacuum chamber 33, because the resistance encountered by the air flow in the suction tube 9 and the suction hose 13 is low relative to the resistance encountered by the air flow past the surface 5 to be cleaned and the edges of the suction opening 35 of the section attachment 7. The control unit 49 comprises a first comparator 67 having a first electrical input 69 for receiving the signal $u_{HMIN}$, a second electrical input 71 for receiving the signal $u_{HM}$, and an electrical output 73 for supplying an electric difference signal $u_{DH}$ which corresponds to a difference $u_{HM} - u_{HMIN}$ between the signals $u_{HM}$ and $u_{HMIN}$.

As is further shown in FIG. 4, the control unit 49 comprises a third electrical input 75 for receiving an electric signal $u_{IM}$ and a fourth electric input 77 for receiving an electric signal $u_{HSM}$. The signal $u_{IM}$ corresponds to a so-called measured electric current through the first motor 25 and the signal $u_{HSM}$ corresponds to a suction pressure $H_S$ of the suction unit 23, i.e. an air pressure in the air channel 29 measured upstream and in the proximity of the suction unit 23. The nature of the signal $u_{IM}$ as well as that of the signal $u_I$ depend on the manner in which the motor 25 is powered. In the embodiment of a vacuum cleaner in accordance with the invention shown in the Figures the signal $u_{IM}$ for example corresponds to a measured phase angle $\phi_T$ of a voltage across the motor 25 at which said triac circuit interrupts the current through the motor 25. The signal $u_{HSM}$ is supplied by a second pressure sensor 79, shown only diagrammatically in FIG. 1 and disposed in the air channel 29 between the filter 27 and the suction unit 23. This arrangement of the second pressure sensor 79 provides a maximal accuracy of the measurement of said suction pressure $H_S$ of the suction unit 23. In an alternative embodiment of a vacuum cleaner in accordance with the invention, however, the second pressure sensor 79' can also be arranged between the dust container 19 and the filter 27. This arrangement of the second pressure sensor 79' also provides an accurate measurement of the suction pressure $H_S$ if the filter 27 is not soiled. Depending on constructional details of the air channel 29 an arrangement of the second pressure sensor 79' between the dust container 19 and the filter 27 may be constructionally simpler than an arrangement of the second pressure sensor 79 between the filter 27 and the suction unit 23.

As is further shown in FIG. 4, the control unit 49 comprises a second microprocessor 81 having a first electrical input 83 for receiving the signal $u_{IM}$, a second electrical input 85 for receiving the signal $u_{HSM}$, and an electrical output 87 for supplying an electric signal $u_{QM}$ which corresponds to an indirectly measured air flow in the air channel 29. The second microprocessor 81 comprises an electrical memory in which a relationship between the air flow Q in the air channel 29, the suction pressure $H_S$ of the suction unit 23, and the electric current through the motor 25, i.e. said phase angle $\phi_T$ of the triac circuit, is stored in the form of a table. Said relationship for the suction unit 23 has previously been measured or calculated by means of a physical model of the suction unit 23. The use of the microprocessor 81 with said electrical memory enables the magnitude of the air flow Q to be read out of the memory in an accurate manner and without any significant delay, as a function of the measured current through the motor 25 and the measured suction pressure $H_S$ of the suction unit 23, so that the magnitude of the air flow Q in the vacuum cleaner and in the vacuum chamber 33 is measured indirectly by means of comparatively simple and reliable measurements of the suction pressure $H_S$ and the phase angle $\phi_T$. In this way a comparatively intricate and unreliable direct measurement of the air flow is avoided. It is to be noted that in an alternative embodiment of a vacuum cleaner in accordance with the invention, instead of the second microprocessor 81, an alternative microprocessor can be used which has an electrical memory in which a relationship between the air flow Q through the suction unit 23, the suction pressure $H_S$ of the suction unit 23, and a speed of the suction unit 23 or of the first motor 25 is stored in the form of a table. Instead of the signal $u_{IM}$ the alternative microprocessor receives an electric signal $u_{NM}$ which corresponds to a measured speed of the first motor 25 of the suction unit 23. As the relationship between the air flow through the suction unit 23, the suction pressure $H_S$ of the suction unit 23, and the speed of the suction unit 23 can be measured or calculated in advance and, moreover, the speed of the first motor 25 or the suction unit 23 as well as the phase angle $\phi_T$ can be measured simply and reliably, an unreliable and intricate direct measurement of the air flow Q through the vacuum cleaner and the vacuum chamber 33 is also avoided by the use of the alternative microprocessor.

The control unit 49 comprises a second comparator 89 having a first electrical input 91 for receiving the signal $u_{QMAX}$, a second electrical input 93 for receiving the signal $u_{QM}$, and an electrical output 95 for supplying an electric difference signal $u_{DQ}$ which corresponds to a difference $u_{QMAX} - u_{QM}$ between the signals $u_{QM}$ and $u_{QMAX}$. The control unit 49 further comprises a third microprocessor 97 having a first electrical input 99 for receiving the difference signal $u_{DH}$, a second electrical input 101 for receiving the difference signal $u_{DQ}$, and an electrical output 103 for supplying the signal $u_I$ already discussed above. The third microprocessor 97 has been loaded with a control algorithm which determines the signal $u_I$ in such a manner that the two difference signals $u_{DH}$ and $u_{DQ}$ do not become negative and at least one of the difference signals $u_{DH}$, $u_{DQ}$ becomes zero. In this way it is achieved in accordance with the control strategy described above, that the measured air pressure in the vacuum chamber 33 does not become smaller than the first limit value $H_{MIN}$ and the air flow in the vacuum chamber 33 does not exceed the second limit value $Q_{MAX}$, and that at least one of the two limit values $H_{MIN}$, $Q_{MAX}$ is reached.

Since in the embodiment of a vacuum cleaner in accordance with the invention described above the first limit value $H_{MIN}$ is independent of the selected mode of operation of the brush 41, it is also possible to use a comparatively simple customary pressure switch, known per se, instead of the first pressure sensor 65. Such a pressure switch is activated, for example, if the air pressure near the coupling member 15 exceeds the first limit value $H_{MIN}$ and is deactivated if the air pressure near the coupling member 15 is smaller than the first limit value $H_{MIN}$. If such a pressure switch is used and is set to the first limit value $H_{MIN}$, the first microprocessor 55 need not supply the signal $u_{HM}$ and the first comparator 67 can be dispensed with. The first electrical input 99 of the third microprocessor 97 then receives an electric signal which corresponds to an activated or deactivated state of said pressure switch directly from the pressure switch. This simplifies the control unit 49.

It is to be noted that the air pressure H or the air flow Q in the vacuum chamber 33 of the suction attachment 7 is set by the control unit 49 independently of a quantity of dust and dirt present in the dust container 19. As a result of this, a resistance presented to the air flow by the dust and dirt present in the dust container 19 is compensated for automatically by an increase of the power produced by the first motor 25. In this way, the cleaning performance of the vacuum cleaner is substantially independent of a degree of filling of the dust container 19.

The vacuum cleaner in accordance with the invention described hereinbefore is of a type referred to as a canister-type vacuum cleaner, which has a suction attachment 7 which, via a suction hose 13, is coupled to a wheeled housing 1 which accommodates the suction unit 23. It is to be noted that the invention can also be applied to vacuum cleaners of another type, such as for example those referred to as upright vacuum cleaners, in which the suction attachment and the housing with the suction unit have been coupled directly to one another or have been secured to a common frame.

Furthermore, it is to be noted that instead of the control strategy described above it is possible to use another control strategy which depends on the mode of operation to which the brush has been set by the user. For example, the first limit value $H_{MIN}$ and the second limit value $Q_{MAX}$ can have values which depend on the selected mode of operation of the brush. If the brush has more than two selectable modes of operation, such as for example different speeds, it is possible in accordance with the invention to set another value for the first limit value $H_{MIN}$ or the second limit value $Q_{MAX}$ for each mode of operation. In accordance with the invention the first limit value $H_{MIN}$ can be dependent not only on the selected mode of operation of the brush but also on other parameters, such as for example the air flow Q, and also the second limit value $Q_{MAX}$ can be dependent not only on the selected mode of operation of the brush but also on other parameters, such as for example the air pressure in the vacuum chamber of the suction attachment. However, in accordance with the invention it is also possible to use other so-called flow characteristics, i.e. relationships between air pressure and air flow in the suction attachment, which are dependent on the selected mode of operation of the brush.

Moreover, it is to be noted that instead of the second microprocessor 81 with the electrical memory it is also possible to use a microprocessor which has been loaded with an algebraic relationship between the air flow Q, the suction pressure $H_S$ and the phase angle $\phi_T$ or the speed of the suction unit 23. The air flow Q is then computed as a function of the measured suction pressure and the measured phase angle or the measured speed.

Finally, it is to be noted that instead of the control unit 49 it is also possible to use another control unit based on customary control principles which are known per se, such as for example a digital control unit or a control unit based on control rules referred to as fuzzy-logic control rules.

What is claimed is:

1. A vacuum cleaner comprising a housing, a suction unit comprising a vacuum chamber accommodated in the housing and drivable by means of a first electric motor, a suction attachment having a rotatable brush which is adapted to be driven in a mode of operation selected from multiple modes of operation by the user and which is drivable by means of a second electric motor, a control unit for controlling an electric current through the first motor, and means in operative association with said rotatable brush and said control unit for enabling the user to select a mode of operation of the rotatable brush,
   wherein the current through the first motor is controllable by means of the control unit as a function of the mode of operation of the brush that is selected by a user of the vacuum cleaner, and
   wherein the control unit comprises means for controlling the current through the first motor in such a manner that an air pressure in the suction attachment does not decrease below a first limit value, a measurement of an air flow in the vacuum cleaner does not exceed a second limit value, and at least one of the two limit values is reached, the control unit determining at least one of the two limit values in dependence upon the mode of operation selected for the brush by the user.

2. A vacuum cleaner as claimed in claim 1, wherein the second limit value has a first value if the brush has been turned off and has a second value if the brush has been turned on, the first value being greater than the second value.

3. A vacuum cleaner as claimed in claim 2, wherein the control unit comprises a processor which determines the air flow in the vacuum chamber of the suction attachment as a function of a suction pressure of the suction unit, which suction pressure is measured upstream and in the proximity of the suction unit, means for measuring the current value through the first motor and an electrical output for supplying an electrical signal which corresponds to the measured speed of the first motor.

4. A vacuum cleaner as claimed in claim 2, wherein the control unit comprises a processor which determines the air flow in the vacuum chamber of the suction attachment as a function of a suction pressure of the suction unit, which suction pressure is measured upstream and in the proximity of the suction unit, means for measuring the current value through the first motor and an electrical input for receiving an electrical signal which corresponds to the measured speed of the first motor.

5. A vacuum cleaner as claimed in claim 2, wherein the first limit value is independent of the mode of operation selected for the brush by the user, the air pressure in the suction attachment being measurable by means of a pressure switch.

6. A vacuum cleaner as claimed in claim 2, wherein the air pressure in the suction attachment is measurable by means of a pressure sensor arranged near a coupling member by means of which a hose which is placed between the suction attachment and the housing is coupled to the housing.

7. A vacuum cleaner as claimed in claim 1, wherein the control unit comprises a processor which determines the air flow in the vacuum chamber of the suction attachment as a function of a suction pressure of the suction unit, which suction pressure is measured upstream and in the proximity of the suction unit, and means for measuring the current value through the first motor including an electrical output for supplying an electrical signal which corresponds to the measured electric current through the first motor.

8. A vacuum cleaner as claimed in claim 7, wherein the processor comprises an electrical memory in which a relationship between the air flow, the suction pressure of the suction unit and the electric current through the first motor is stored in the form of a table.

9. A vacuum cleaner as claimed in claim 8, wherein the suction pressure of the suction unit is measurable by means of a pressure sensor arranged between a dust container of the vacuum cleaner and the suction unit.

10. A vacuum cleaner as claimed in claim 7, wherein the suction pressure of the suction unit is measurable by means of a pressure sensor arranged between a dust container of the vacuum cleaner and the suction unit.

11. A vacuum cleaner as claimed in claim 7, wherein the first limit value is independent of the mode of operation selected for the brush by the user, the air pressure in the suction attachment being measurable by means of a pressure switch.

12. A vacuum cleaner as claimed in claim 7, wherein the air pressure in the suction attachment is measurable by means of a pressure sensor arranged near a coupling member by means of which a hose which is placed between the suction attachment and the housing is coupled to the housing.

13. A vacuum cleaner as claimed in claim 1, wherein the control unit comprises a processor which determines the air flow in the vacuum chamber of the suction attachment as a function of a suction pressure of the suction unit, which suction pressure is measured upstream and in the proximity of the suction unit, means for measuring the current value through the first motor and an electrical input for receiving an electrical signal which corresponds to the measured speed of the first motor.

14. A vacuum cleaner as claimed in claim 13, wherein the suction pressure of the suction unit is measurable by means of a pressure sensor arranged between a dust container of the vacuum cleaner and the suction unit.

15. A vacuum cleaner as claimed in claim 13, wherein the first limit value is independent of the mode of operation selected for the brush by the user, the air pressure in the suction attachment being measurable by means of a pressure switch.

16. A vacuum cleaner as claimed in claim 13, wherein the air pressure in the suction attachment is measurable by means of a pressure sensor arranged near a coupling member by means of which a hose which is placed between the suction attachment and the housing is coupled to the housing.

17. A vacuum cleaner as claimed in claim 1, wherein the first limit value is independent of the mode of operation selected for the brush by the user, the air pressure in the suction attachment being measurable by means of a pressure switch.

18. A vacuum cleaner as claimed in claim 17, wherein the air pressure in the suction attachment is measurable by means of a pressure sensor arranged near a coupling member by means of which a hose which is placed between the suction attachment and the housing is coupled to the housing.

19. A vacuum cleaner as claimed in claim 1, wherein the air pressure in the suction attachment is measurable by means of a pressure sensor arranged near a coupling member by means of which a hose is placed between the suction attachment and the housing is coupled to the housing.

* * * * *